Patented Apr. 25, 1939

2,155,984

UNITED STATES PATENT OFFICE 2,155,984

TEMPERATURE CONTROL SYSTEM

Paul F. Shivers, Wabash, Ind., assignor to Minneapolis-Honeywell Regulator Company, Minneapolis, Minn., a corporation of Delaware Application October 31, 1935, Serial No. 47,723

12 Claims. (Cl. 236—15)

My invention relates to a temperature control system, and more particularly to one employing photo-electric cells.

Various temperature measuring devices have been devised which are based upon the use of one or more photo-electric cells for measuring the temperature of a hot body by measuring the illumination given off by said body. In some cases, these devices have been associated with means for controlling the temperature so as to function as combined temperature measuring and controlling devices. These prior devices have the disadvantage that they are dependent upon the voltage of a power supply being maintained comparatively constant. Where there was any serious fluctuation in the voltage of said power supply, these devices have failed to indicate and control the temperature properly.

An object of the present invention is to provide a temperature controlling means employing the use of a photo-electric cell which temperature controlling means is independent of voltage variations in the power supply.

A further object of this invention is to provide a temperature controlling system employing the use of two cooperating self-balancing systems, one of which is controlled by the temperature and the other of which controls temperature varying means.

Figure 1:
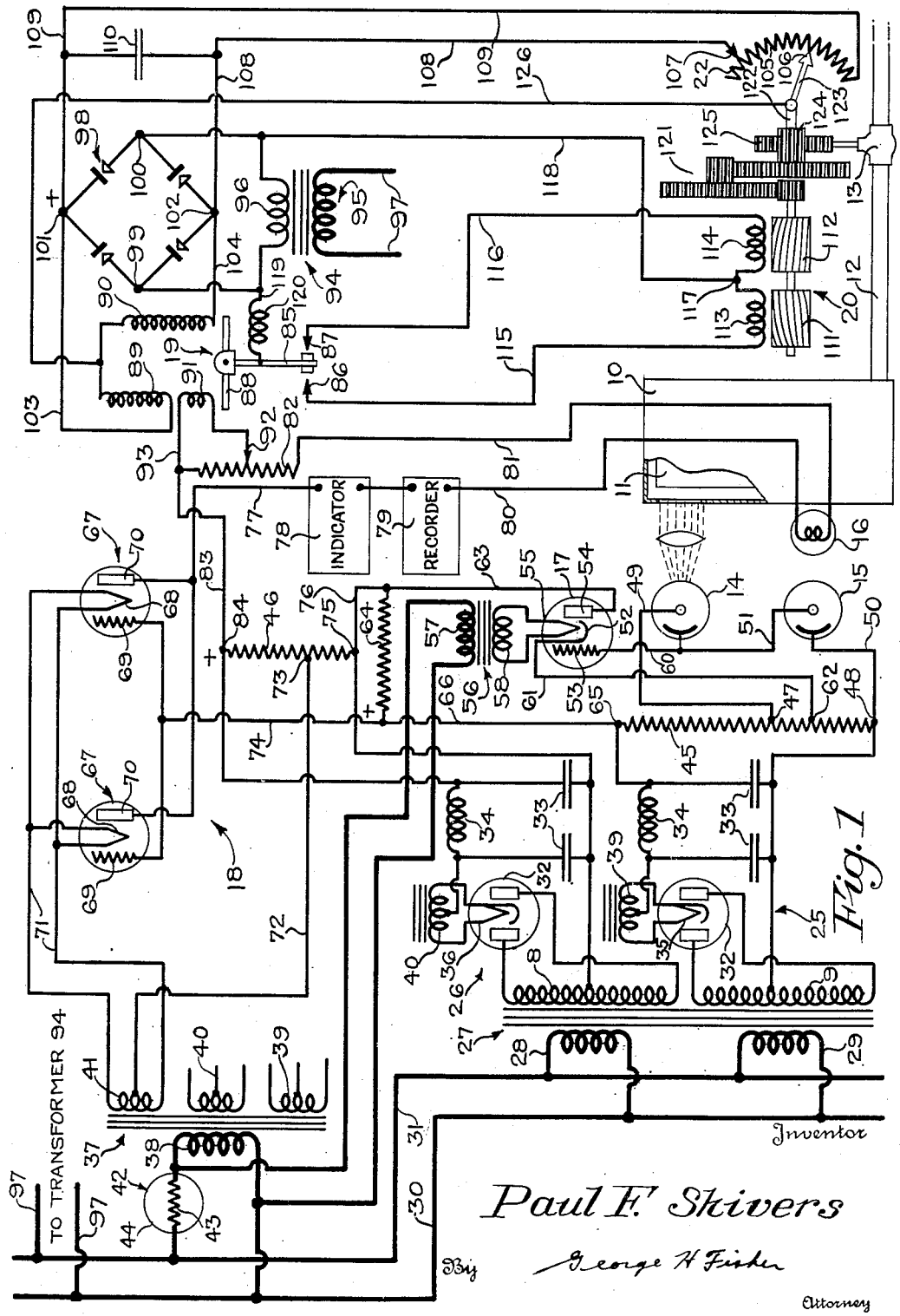
Figure 2:
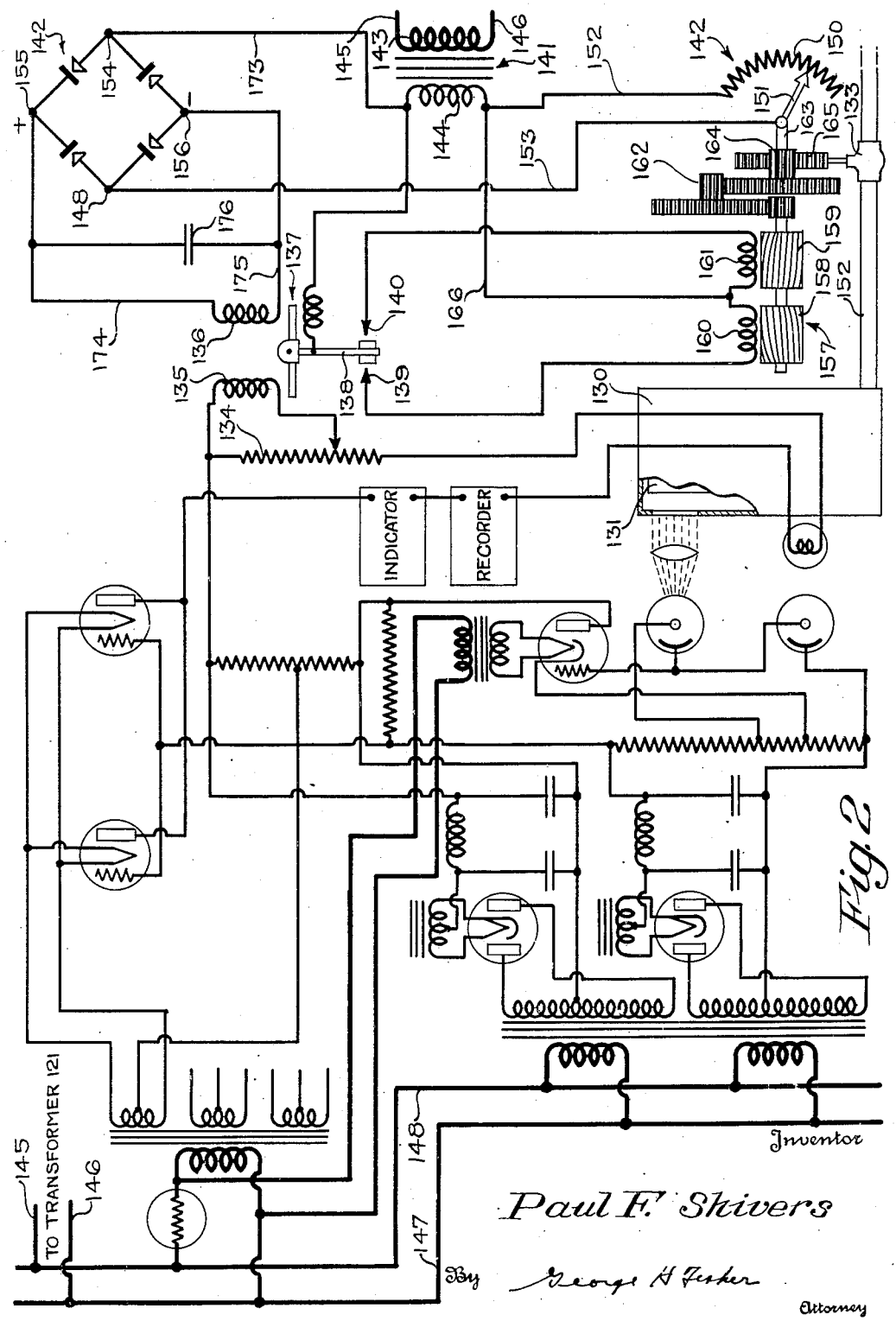

Further objects of the invention will be apparent from the accompanying specification and drawings, of which Figure 1 is a schematic view of my preferred species and of which Figure 2 is a schematic showing of a modification thereof.

A furnace or other heating means is designated by the reference numeral 10. Located in said furnace is an object 11 which is heated thereby. The furnace is supplied with fuel through a pipe 12 which is controlled by a valve 13.

A portion of my control system which is directly controlled by the temperature of object 11 is shown in the left-hand portion of the figure. This portion of my system comprises two photo-electric cells 14 and 15, of which cell 14 is located to receive light from the hot body and cell 15 to receive light from an electric lamp 16. The two cells constitute two arms of a Wheatstone bridge across which is connected a thermionic amplifier 17, the grid circuit of which forms a bridging connection across the two halves of the electrical bridge. The system is designed so as to be balanced when the amounts of light supplied to the cells bear a predetermined ratio to each other. Any decrease in the ratio of the light supplied to cell 14 to that to cell 15 by reason of the temperature of the hot body rising, causes the potential of the grid to be increased, while an opposite change in the ratio causes a decrease in the potential of the grid. The output of amplifier tube 17 is applied to a second thermionic amplifier 18, the output of which is to be employed to energize lamp 16. If the temperature of the hot body is increased, the ratio of the amounts of light supplied to cells 14 and 15 respectively, will be decreased, thus causing an increase in the output current of amplifier 17, which is amplified through amplifier 18 and causes an increase in current flow through lamp 16 which is sufficient to restore the previous ratio in the amounts of lights supplied to the two cells. This increase in flow of current to the lamp 16 serves as a means for indicating the temperature and for operating a portion of my control system which operates the temperature varying means. This portion of my system is shown in the right hand section of the drawings.

The last mentioned portion of my control system broadly comprises a balanced relay switch 19 which is unbalanced upon a change in the flow of current to the lamp 16. Said switch 19 upon being moved to either of two closed positions by such an unbalanced condition causes a reversible motor 20 to rotate in either of two directions. This motor controls the adjustment of valve 13 and controls a rheostat 22 which acts to rebalance switch 19 moving it again to an open position.

Referring more particularly now to the details of my apparatus, I obtain direct current for the operation of the photo-electric cells and the various amplifier tubes through rectifier-filter systems 25 and 26. These rectifier-filter systems are supplied with alternating current by a transformer 27 having a plurality of primaries 28 and 29 connected to line wires 30 and 31 which are connected to a suitable commercial source of alternating current. Said transformer 27 also comprises a plurality of secondaries 8 and 9 which are connected to the respective rectifier-filter systems 25 and 26. The rectifier-filter systems 25 and 26 are of the type well known in the art and each comprises a full wave thermionic rectifier tube 32, a plurality of condensers 33 connected across the output of said tube and a choke coil 34 connected in the output circuit between the points at which the condenser is connected. Condensers 33 and choke coils 34 serve to filter the output of the rectifiers and to almost entirely eliminate the pulsations in the current supplied by said amplifiers, in a manner well known in the art.

The way in which my power supply unit differs from the conventional type is in the employment of a separate transformer for supplying heating current to the filament heaters 35 and 36. A transformer 37 is provided for this purpose. Said transformer comprises a primary 38 and a plurality of low voltage secondaries 39, 40 and 41. The primary 38 is connected to line wires 30 and 31 through a voltage regulator 42. This voltage regulator comprises a resistance element 43 located in an evacuated receptacle 44. The resistance element 43 is of a material whose resistance varies almost directly with the voltage applied to its terminals and so serves as a means for maintaining a constant current flow through primary 38 regardless of variations in the line voltage. The heating current for the filaments of all the thermionic tubes employed in my system is controlled by this voltage regulator and in this manner I safeguard against the possibility of the operation of my system being affected by a variation in the temperature of the filaments caused by a voltage variation. Secondaries 39 and 40 of transformer 37 supply heating current to the heating filaments 35 and 36 respectively.

The output of the rectifier-filter system 25 is connected across a potentiometer 45 which serves to supply current for the operation of the photoelectric cells 14 and 15 and for the operation of the amplifier 17. The output of the rectifier-filter system 26 is connected across a potentiometer 46 which serves to supply current for the operation of the amplifier 18.

The photo-electric cells 14 and 15 are connected in series with a portion of the potentiometer 45 between tap 47 and the negative terminal 48 through conductors 49, 50 and 51, and accordingly have a voltage corresponding to the potential drop between tap 47 and terminal 48 impressed across their terminals.

The amplifier 17 is a conventional three-electrode thermionic vacuum tube. This tube is shown in the drawings as a tube of the type in which the cathode is indirectly heated. The tube comprises the usual cathode 52, the grid 53 and a plate 54. As previously indicated, the cathode 52 is indirectly heated by means of a heater 55. This heater is supplied with current through a transformer 56 comprising a line voltage primary 57 and a secondary 58. The primary 57 is connected through conductors 59 in parallel with the primary 38 in such a manner that all the current flowing to said primary 57 passes through the voltage regulator 42.

The grid 53 is connected through conductor 60 with conductor 51 at a point intermediate of the two photo-electric cells. The cathode 52 is connected through a conductor 61 with potentiometer 45 at a tap 62. It will be seen that the portion of the grid circuit comprising conductor 61, cathode 52, grid 53 and conductor 60 constitutes a bridging connection across a Wheatstone bridge, two arms of which are constituted by the two photo-electric cells 14 and 15 and the other two arms of which are constituted by the two sections of potentiometer 45 between tap 47 and tap 62 and between tap 62 and terminal 48. So long as the bridge is balanced no voltage will be impressed upon the grid circuit. Upon the conductivity of photo-electric cell 15 increasing, however, the bridge will be unbalanced with the result that grid 53 is maintained at a potential lower than cathode 52. It will thus be seen that any variation in the relative conductivity of cells 14 and 15 will change the potential on the grid circuit and thus change the flow of current in the plate circuit of tube 17. Since it is desirable that the grid be always maintained at a lower potential than the cathode, the circuit is designed so that when the system as a whole is balanced for a temperature of the hot body 11 close to the desired value, the light received by cell 15 will be sufficiently greater than that received by cell 14, that the grid will be biased negatively to a point where the tube 15 is operating in the midpoint of the straight line portion of its characteristic curve.

The plate 54 of tube 17 is connected through a conductor 63 with one terminal of a resistor 64. The other terminal of said resistor is connected to the positive terminal 65 of potentiometer 45 through conductor 66. The portion of the potentiometer from terminal 65 to tap 62 determines the voltage applied to the plate circuit of tube 17. The resistor 64 constitutes the load resistance of the tube and serves as a coupling resistance between said tube and the amplifier 18 to be presently described. Since under a balanced condition of the system, the bias of grid 53 is never so great as to prevent flow of plate current, current will normally flow through resistor 64. Thus, there is always some potential drop across resistor 64 while the apparatus is in operation.

The amplifier 18 is shown as comprising two conventional three-electrode thermionic vacuum tubes 67. These tubes each comprise a filament 68, a grid 69 and a plate 70. The filaments 68 are supplied with heating current from the secondary 41 of transformer 37 through conductors 71. Connected to a mid-point of secondary 41 is a conductor 72 which is connected to potentiometer 46 at a tap 73. This connection serves in effect to connect the cathodes 68 to the potentiometer at the tap 73. The grids 69 are connected in parallel to the positive terminal of resistor 64 through a conductor 74. The negative terminal 75 of potentiometer 46 is connected to the resistor 64 at the terminal opposite to that to which grids 69 are connected. The grid circuits of the tubes 67 thus comprise the filaments 68, conductor 71, conductor 72, the portion of potentiometer 46 between tap 73 and negative terminal 75, conductor 76, resistor 64, conductor 74 and grid 69. It will thus be seen that the grids 69 are biased negatively with respect to the cathode 68 by a voltage corresponding to the voltage drop across the portion of potentiometer 46 between tap 72 and negative terminal 75 minus the voltage drop across resistor 64. Thus, any variation in the current flow through resistor 64 due to a change in the plate current of tube 17 will affect the bias of the grid 69.

The output circuit of tubes 67 is constituted by plates 70, conductor 77, an indicator 78, a recorder 79, a conductor 80, lamp 16, conductor 81, resistor 82, conductor 83, the portion of the potentiometer 46 between the positive terminal 84 and tap 73, conductors 72 and 71 and the cathode 68. Thus any change in the output current of tube 67 will cause a change in the flow of current through lamp 16, through the indicator 78 and recorder 79, and through resistance 82. The portion of potentiometer 46 between the terminal 84 and tap 73 determines the voltage applied to the plate circuits of tube 68.

The portion of my system just described constitutes the self-balancing temperature responsive portion of my system. I will now describe the portion of my system which actuates as a temperature control means in response to any change in the previously described temperature responsive means.

As previously stated, switch 19 controls the action of a reversible motor 20 which controls the position of the valve 13 and also a rheostat 22 which in turn controls switch 19. This switch comprises a pivotally mounted switch arm 85 adapted to engage with either of two contacts 86 and 87. This switch arm has a horizontal arm 88 which is subjected to the action of three electro-magnetic coils 89, 90 and 91. Coil 91 is supplied with current through a resistance 82, being connected in parallel with a portion thereof through a sliding contact 92 and conductor 93. The coils 89 and 90 are supplied with current from a source which is entirely independent of the previously described temperature responsive portion of my system. Coils 89 and 91 are located on one side of the switch arm and coil 90 on the other side, and under normal conditions coil 90 exerts an equal and opposite force upon the switch arm to that exerted by coils 89 and 91 acting conjointly. When said switch is so balanced the switch arm 85 is in engagement with neither contacts 86 nor 87.

A step-down transformer 94 serves to supply low voltage current for the relay coils 89 and 90 and for the operation of the reversible motor 20. This transformer comprises a line voltage primary 95 and a low voltage secondary 96. A primary 95 is connected through conductors 97 with line wires 30 and 31.

A rectifier is employed to rectify the current supplied by secondary 96 to the coils 89 and 90. This rectifier may be of any suitable type but is shown for purposes of illustration as a conventional bridge rectifier having input terminals 99 and 100 and output terminals 101 and 102. The input terminals 99 and 100 are connected to the opposite terminals of the secondary 96. Coils 89 and 90 are connected in series through conductors 103 and 104 to the output terminals 101 and 102 of said rectifier. Also connected to said output terminals in parallel with coils 89 and 90 is a rheostat 22. This rheostat comprises a resistance 105 and movable contacts 106 and 107. Contact 107 is connected to the terminal 102 through conductor 108 and the terminal of resistance 105 opposite said contact 107 is connected to the other output terminal 101 of rectifier 98 through a conductor 109. Contact 106 is mounted on an arm 123 and is connected through conductor 126 with the junction of coils 89 and 90. The rheostat thus serves as a voltage divider as will be more fully explained later. Connected between conductors 108 and 109 in parallel with rheostat 22 and with coils 89 and 90 is a condenser 110. This condenser serves to smooth out the pulsations of the current supplied by the rectifier 98.

The reversible motor 20 comprises a plurality of armatures 111 and 112 and a plurality of field windings 113 and 114. One terminal of field winding 113 is connected to conductor 115 with contact 86 and one terminal of field winding 114 is connected to a conductor 116 with contact 87. A common terminal 117 of the two field windings is connected through a conductor 118 with one terminal of the secondary 96 of transformer 94. The opposite terminal of the secondary 96 is connected to the switch arm 85 through a conductor 119 embodying suitable means 120 permitting ready extension and contraction of said conductor. It will be readily seen that when switch arm 85 is in engagement with contact 86, field winding 113 is energized and that when switch arm 85 is in engagement with contact 87, field winding 114 will be energized. The motor 20 will rotate in one or the other direction depending upon which field winding is energized.

The motor 20 is connected through suitable reduction gearing 121 with a shaft 122. This shaft is connected to the arm 123 associated with contact 106 and upon movement of said shaft causes contact 106 to move along the resistance 105. Mounted on said shaft 122 is a pinion 124 which is operatively associated with rack 125 and connected to the stem of valve 13. It will thus be seen that when motor 20 is rotated a simultaneous adjustment is made of valve 13 and of rheostat 22. In the arrangement of the apparatus shown in the drawings the motor rotates in such a direction as to move the valve towards a closed position and to move contact 106 in the direction of contact 107 when field winding 114 is energized. The opposite action takes place when field winding 113 is energized.

As previously explained, contact 106 is connected through arm 123 and through the conductor 126 with the junction of coils 89 and 90. Potentiometer 22 thus serves to divide the current flow between coils 89 and 90. Upward movement of contact 106 causes more current to be supplied to coil 90 and less to coil 89, whereas, a downward movement causes the opposite action. Thus the rheostat 22 serves as a means for rebalancing the switch 19.

Referring now to the operation of my system, let it be assumed that for some reason the temperature of body 11 rises above that desired to be maintained. This results in photo-electric cell 14 being subjected to more light than previously causing grid 53 to become less negative with respect to cathode 52. This causes an increase of current flow in the output circuit of tube 17 with the result that a greater voltage drop occurs across resistor 64. As previously explained, the bias of the grids 69 of tubes 67 depends upon the difference in voltage drops occurring across the portion of potentiometer between tap 73 and negative terminal 75 and across resistor 64. Thus, an increase in the voltage drop across resistor 64 results in a decrease in the negative bias of grids 69 so that the plate current of tubes 67 is increased. This causes an increase in the current supplied to lamp 16, which in turn tends to decrease the potential of the grid and decrease the current to lamp 16. Since the effect of a small change in light received by the photo-electric cells produces a large change in the voltage drops across the same, the value of the light will be the controlling factor in determining the new balance. The result will be that under the new balanced condition which will be reached, the ratio between the amounts of light received by the two cells will differ very slightly from the original ratio although each cell will be receiving more light. This very slight and practically negligible change in the ratio of the amounts of light received by the two cells results in a substantial change in the ratio of the voltage drops across the same, which substantial change is the factor which results in a greater output of tubes 17 and 67, to permit a rebalanced condition in the system as a whole. Under this new balanced condition, the current flow through lamp 16 will be larger than previously, thus resulting in an increased current flow through the indicator 78, the recorder 78 and resistance 82. The increase in current flow through indicator 78 and recorder 79 serves as a means for indicating the increase in temperature of body 11. The increase in current flow through resistance 82 serves as a means for operating temperature controlling means to restore the temperature of body 11 to that desired.

The increased flow of current through resistance 82 results in an increased flow of current through coil 91. The result of this will be that the switch 19 is unbalanced and switch arm 65 will be moved into engagement with contact 86. When this occurs field winding 112 will be energized and the motor will rotate in such a direction as to move rack 125 downwardly thus moving the valve toward a closed position and at the same time to move contact 106 in the direction of contacts 107. The latter action results in a decrease in the current flowing through coil 89 and an increase in the current flowing through coil 90. As will be obvious, this movement of contact 106 on resistance 105 will cause a condition to be reached in which the decreased current flow through coil 89 and the increased current flow through coil 90 compensate for the increase in the current flow through coil 91 due to the increase in the current flow through the lamp circuit 16, thus rebalancing the switch. Thus, the effect of the increase in current flow in the plate circuit of tubes 67 due to the increased temperature of hot body 11 is to cause a movement toward closed position of the valve 13 supplying fuel to the furnace 11 and a rebalancing of the portion of the system controlling the valve.

It will be understood that this entire action of the system takes place almost instantaneously due to the rapid response of the various thermionic devices employed. Thus, upon any appreciable change in temperature of the body 11, the various adjustments are almost instantaneously made resulting in an immediate correction of the undesirable condition and a rebalancing of the entire system.

As previously indicated, one of the marked advantages of my temperature control system over previous systems of this type is the freedom from disadvantageous effects due to voltage variations in the power supply. If we consider, for example, that the line voltage should drop it will be noted that the condition of the bridge to which photo-electric cells 14 and 15 are connected will not be affected as a direct result thereof since while there will be a voltage drop across potentiometer 45 this drop will affect each of the two portions involved in the bridge equally. The voltage drop will, however, reduce the plate voltages across both tube 17 and the two tubes 67 with the result that the current flow through lamp 16 will be reduced. This reduction in current flow through lamp 16 causes an unbalancing of the bridge which tends to increase the current flow through tube 17 and, consequently, the current flow through the output circuit of tubes 67 with the result that lamp 16 is energized more brightly. While the lamp current cannot be restored to exactly the same value it had before the change, since an increase in illumination of the lamp tends to cause the apparatus to decrease the lamp current, it will be restored to a value which differs by an almost negligible amount from that existing before the line voltage dropped. This negligible difference in lamp current causes a sufficient voltage change in cell 15 to change the grid bias sufficiently to cause the tubes to deliver the substantially normal amount of current to the lamp in spite of the decrease in plate voltage. As previously indicated, the heating elements of the various tubes are supplied through a voltage regulator 42 so that these remain unaffected by any variation in line voltage. Moreover, since coils 89 and 90 are located on opposite sides of arm 68 any variation in the line voltage will not appreciably affect switch 19 since the current flow through both of these coils decreases proportionately. In order to avoid any possible unbalancing due to the fact that coils 89 and 90 are subjected to variation in line voltage and coil 91 is not, coils 89 and 90 are made with a relatively large number of turns as compared with coil 91. Thus any variation in line voltage will result in a substantially equal action on each side of the switch arm. It will thus be seen that my temperature control system is remarkably free from voltage variations even where they are relatively large.

In Figure 2 I have shown a modified form of my control system. In this figure, the furnace is designated by the numeral 130, the hot body by the numeral 131, the fuel supply pipe by the numeral 132 and the control valve by numeral 133. Since the portion of my apparatus embodying the photo-electric cells and thermionic amplifiers, which constitutes the self-balancing temperature responsive system is identical with that of Figure 1, and since the operation and structure thereof is obvious in view of the description of the same in connection with Figure 1, detailed description thereof will not be given in connection with this figure.

The coupling resistance in the lamp circuit in this figure is designated by the reference numeral 134. This resistance is employed to supply current to a coil 135 which constitutes one of two electro-magnetic relay coils 135 and 136 of a switch 137 corresponding in function to switch 62 of Figure 1. Switch 137 comprises in addition to said coils 135 and 136, a switch arm 138 adapted to engage with either contact 139 or 140. A coil 136 is supplied with direct current from a step-down transformer 141 through a rectifier 142, which for purposes of illustration is shown as a conventional bridge rectifier.

Transformer 141 comprises a line voltage primary 143 and a low voltage secondary 144. Primary 143 is connected through conductors 145 and 146 with line wires 147 and 148. A rheostat 149 controls the flow of current to the rectifier from transformer 141. Said rheostat 149 comprises a resistance 150 and a contact arm 151. One terminal of resistance 150 is connected through conductor 152 with one terminal of the secondary 144, and the contact arm 147 is connected through conductor 153 with one input terminal 146 of the rectifier 142. The other end of secondary 144 is connected through conductor 173 with the other input terminal 154 of the rectifier 142. The opposite terminals of relay coil 136 are connected through conductors 174 and 175 to the opposite terminals 155 and 156 of the bridge rectifier 142. A condenser 176 is connected across said terminals in parallel with coil 136 to smooth out the pulsations of the current supplied by said rectifier.

A motor 157 is provided to actuate the contact arm 151 of the rheostat 142 and to actuate the valve 133. Said motor is of the reversible type and comprises two rotors 158 and 159, and associated field windings 160 and 161 respectively. The motor is connected through suitable reduction gearing 162 with a shaft 163 which is designed to rotate contact arm 151. Also mounted on said shaft 163 is a pinion 164 operatively associated with a rack 165. This rack is integrally connected to the valve stem so that rotation of shaft 163 causes the position of the valve to be changed.

The adjacent terminals of field windings 160 and 161 are connected through conductor 166 to one terminal of secondary 144. The other end of secondary 144 is connected to switch arm 138. Contacts 139 and 140 are connected to the outermost terminals of the field windings 160 and 161 respectively. If the switch arm 138 engages with contact 139, field winding 160 will be energized and the motor will rotate in a direction to cause upward movement of contact arm 127 and downward movement of rack 141, whereas if the switch arm moves in the opposite direction the other field winding 137 will be energized and the motor will rotate in the opposite direction.

In the event of a change in temperature of the hot body 131 with the resultant change in flow of current to the lamp circuit, the energization of coil 135 will be affected in the same manner as was the energization of coil 70 in my preferred species. This will result in the balance between coils 135 and 136 being destroyed thus causing switch arm 138 to move into engagement with contact 139 or contact 140. If we assume that the temperature of the hot body is increased, the energization of coil 135 will be increased due to an increase in the flow of current through the lamp circuit and switch arm 138 will be moved to the left into engagement with contact 139. This will result in field winding 160 being energized, causing the motor to rotate in such a direction as to move rack 163 downwardly thus moving the valve towards a closed position and decreasing the amount of fuel supplied to furnace 130. At the same time contact arm 151 is moved upwardly on resistance 150 with the result that more current is supplied to the rectifier and consequently more current is supplied to coil 136. This action will continue until coils 115 and 116 are again balanced and switch arm 118 is again in its central open position.

While this species of my invention is not as free from voltage variations as my preferred species in that the current through coil 115 is not subject to voltage variations whereas the current through coil 116 is, it nevertheless functions very satisfactorily where large voltage variations are not encountered, or where the error due to such a voltage variation in the temperature controlling system is not of serious consequence. In this case, as in the preceding one, the temperature control system which I have devised employs two self-balancing systems thus insuring a temperature control system which is inherently self-balancing.

While I have shown and described two specific embodiments of my invention it will be understood that these are for purposes of illustration only and my invention is to be limited only by the scope of the appended claims.

I claim:

1. In combination, a source of light, the intensity of which is to be maintained at a predetermined value, means for varying the intensity of said light, a control device for said intensity varying means, a photo-electric cell of the electron emissive type arranged to receive light from said source, a second photo-electric cell of the electron emissive type, an electric lamp illuminating said second photo-electric cell so as to maintain a substantially fixed ratio in the amounts of light supplied to said cells, thermionic means active upon a change in said ratio due to a change in the intensity of the source of light to vary the current supplied to said electric lamp to vary the illumination so as to restore said ratio in the amounts of light supplied to said cells, and further means responsive to a variation in the energy supplied to said illuminating means to cause said intensity varying means to restore the intensity of the light to the predetermined value, said last named means comprising a pair of electro-magnetic coils, one of said coils being energized in accordance with the current flow through said lamp, the other of said coils being energized by a source of energy independent of the current flow through said lamp, switching means controlled by said coils and adapted to be in an open position when both of said coils are substantially equally energized, means responsive to movement of said switching mechanism from an open position due to an unbalance of said coils caused by a variation in current flow through the electric lamp to correspondingly vary the current supplied to the second of said coils, so as to restore the balance between said coils, and to simultaneously adjust the control device an amount proportional to said variation.

2. In a system for maintaining a temperature at a predetermined value, means for varying the temperature, a source of electric current, an electrical circuit energized by said source of current and including means responsive to a change in temperature to vary the current flow through said circuit, a switch movable in either direction from an intermediate open position to a closed position, a pair of electro-magnetic coils adapted upon equal energization thereof to hold said switch in said open position, and upon unbalance in the energization of said coils to move said switch to a closed position, one of said coils being energized by the flow of current through said circuit, the other of said coils being energized by said source of current independently of said circuit, and means operable upon said switch being moved to a closed position by reason of an unbalance in the energization of said coils to vary the current flow through said second mentioned coil to restore the balance between said coils and to adjust said temperature varying means to cause the same to restore the temperature to substantially said predetermined value.

3. In a system for maintaining a temperature at a predetermined value, means for varying the temperature, a source of electric current, an electrical circuit energized by said source of current and including means responsive to a change in temperature to vary the current flow through said circuit, a switch movable in either direction from an intermediate open position to a closed position, a pair of electro-magnetic coils adapted upon equal energization thereof to hold said switch in said open position, and upon unbalance in the energization of said coils to move said switch to a closed position, one of said coils being energized by the flow of current through said circuit, the other of said coils being energized by said source of current independently of said circuit, a rheostat controlling the flow of current to said last mentioned coil, and a motor controlled by said switch and actuating said rheostat and said temperature varying means, said motor acting upon said switch being moved to a closed position by reason of the unbalance in the energization of said coils to vary the current flow through said mentioned coil to restore the balance between said coils and to adjust said temperature varying means to cause the same to restore the temperature to substantially said predetermined value.

4. In a system for maintaining a temperature at a predetermined value, means for varying the temperature, a source of electric current, an electrical circuit energized by said source of current and including means responsive to a change in temperature to vary the current flow through said circuit, a switch movable in either direction from an intermediate open position to a closed position, a plurality of electro-magnetic coils, one of which is energized by the current flow through said circuit and at least two of which are energized by said source of current independently of said circuit, the coils being located relative to said switch so that the first mentioned coil and one of the last mentioned coils act conjointly to urge the switch in one direction and the other of said coils urges the switch in the other direction, means for varying the current flow through said two last mentioned coils to balance the action of all of the coils on said switch, and means operable upon said switch being moved to a closed position by reason of an unbalance in the energization of said coils to act on said current varying means to restore the balance of the coils and to act on said temperature varying means to restore the temperature to substantially said predetermined value.

5. In a system for maintaining a temperature at a predetermined value, means for varying the temperature, a source of electric current, an electrical circuit energized by said source of current and including means responsive to a change in temperature to vary the current flow through said circuit, a switch movable in either direction from an intermediate open position to a closed position, an electro-magnetic coil energized by the current flow through said circuit, a pair of electro-magnetic coils connected in series to said source of current independently of said circuit, a control potentiometer comprising a resistance and a sliding contact, said potentiometer being connected to said source of current in parallel with said pair of coils and the sliding contact of said potentiometer being connected to the junction of said coils, said potentiometer serving to control the distribution of the current flow through said coils, the first mentioned electromagnetic coil and one of the second mentioned coils urging the switch in one direction and the other of said coils urging said switch in the other direction, and means controlled by said switch and operable upon said rheostat to maintain said coils balanced, and upon said temperature varying means to adjust said temperature.

6. In a system for controlling a condition, condition varying means, a source of electric current, an electrical circuit energized by said source of current and including means responsive to a change in condition to vary the current flow through said circuit, a switch movable in either direction from an intermediate open position to a closed position, an electromagnetic coil energized by the current flow through said circuit, a pair of electro-magnetic coils connected in series to said source of current independently of said circuit, a control potentiometer comprising a resistance and a sliding contact, said potentiometer being connected to said source of current in parallel with said pair of coils and the sliding contact of said potentiometer being connected to the junction of said coils, said potentiometer serving to control the distribution of current flow through said coils, the first mentioned electromagnetic coil and one of the second mentioned coils urging the switch in one direction and the other of said coils urging said switch in the other direction, and means controlled by said switch and operable upon said rheostat to maintain said coils balanced, and upon said condition varying means to adjust said condition.

7. In a system for controlling a condition, condition varying means, a source of electric current, an electrical circuit energized by said source of current and including means responsive to a change in condition to vary the current flow through said circuit, a switch movable from an intermediate open position into either of two closed positions, an electro-magnetic coil energized by the current flow through said circuit, a pair of electromagnetic coils connected in series to said source of current independently of said circuit, means for dividing the current flow through said pair of coils and for varying said dvision of current flow, said first coil having an electro-magnetic effect which is relatively small in comparison to that of either of said pair of coils, the first mentioned coil and one of said second mentioned coils urging the switch in one direction and the other of said coils urging the switch in the other direction, and means controlled by said switch and operable upon said rheostat to maintain said coils balanced and upon said condition varying means to adjust said condition.

8. In apparatus for controlling the temperature of a hot body, means for varying the temperature of said hot body, control means therefor, electrical motor means for varying the controlling position of said control means, a balanced relay for controlling said motor means and comprising two opposed relay windings, means including a photo-electric device responsive to the temperature of the hot body for controlling the energization of one of said windings and means controlled in accordance with the position of said control means for energizing the other winding, said relay being operative upon the same being unbalanced by a variation in the output of said photoelectric cell due to a change in temperature of the hot body to cause said motor means to be energized in a direction and to an extent such that said controlling means is adjusted an amount proportional to such variation.

9. In condition changing apparatus, condition varying means, control means therefor, electrical motor means for adjusting the position of said control means, a balanced relay for controlling said motor means and comprising two opposed relay windings, means for energizing one of said relay windings comprising a grid controlled space discharge amplifier, an input grid circuit therefor comprising means responsive to said condition, and an output circuit electrically connected to said relay winding, and means controlled in accordance with the position of said control means for energizing the other of said relay windings, said relay being operative upon the same being unbalanced by a variation in the output of said amplifier due to a change in said condition to cause said motor means to be energized in a direction and to an extent such that said control means is adjusted an amount proportional to said variation.

10. In condition controlling apparatus, condition changing means employing a fluid medium, a valve for controlling the flow of said medium, reversible motor means for operating said valve, energizing means therefor, means connecting said motor to said energizing means including a balanced relay adapted when said relay is unbalanced in one direction to cause said motor to rotate in one direction to close said valve and when said relay is unbalanced in the other direction to cause said motor to rotate in the opposite direction, said relay comprising a pair of opposed relay windings, means for energizing one of said relay windings comprising a space discharge amplifier, an input circuit therefor comprising means responsive to said condition, and an output circuit electrically connected to said relay winding, and means responsive to the position of said valve for energizing the other of said relay windings, said relay being operative upon the same being unbalanced by a variation in the output of said amplifier due to a change in said condition to cause said motor means to be energized in a direction and to an extent such that said valve is adjusted an amount proportional to said variation.

11. In combination, a source of light the intensity of which is to be maintained at a predetermined value, means for varying the intensity of said light, a photo-electric cell of the electron emissive type arranged to receive light from said source, a second photo-electric cell of the electron emissive type, means for illuminating said second photo-electric cell to maintain a substantially fixed ratio in the amounts of light supplied to said cells, means responsive to a change in the intensity of said source of light with the resultant change in said ratio to vary the energy supplied to said illuminating means to restore said ratio in the amounts of light applied to said cells, further means responsive to a variation in the energy supplied to said illuminating means to cause said intensity varying means to vary the intensity of said source of light to restore the value thereof to the predetermined value, said last named means comprising a control device for said intensity varying means, motor means for operating said control device, control means for said motor means operative as a result of a variation in the energy supplied to said illuminating means to cause said motor means to be energized in a direction and to an extent such that said control device is adjusted an amount proportional to said variation in energy supplied to said illuminating means.

12. In combination with a heating device, a photo-electric unit of the electron emissive type arranged to be subjected to the light from a body heated by said device, a second electrically energized source of light, a second photo-electric unit of the electron emissive type arranged to receive light from said second source of light, a grid controlled space discharge device, energizing means, and connections between said energizing means, said photo-electric units, and said space discharge device operative to vary the grid bias of said device upon a change in the relative amounts of light received by said units, means operative to maintain a definite relationship between the energization of said second source of light and the output of said space discharge device, and means operative to control said heating device in accordance with the energization of said second source of light, said last named means comprising a control device for said heating device, motor means for operating said control device, control means for said motor means responsive to the energization of said second light source and operative upon a variation in such energization to cause said motor means to be energized in a direction and to an extent such that said control device is adjusted an amount proportional to said variation.

PAUL F. SHIVERS.